(12) United States Patent
Harpold et al.

(10) Patent No.: US 8,455,926 B2
(45) Date of Patent: Jun. 4, 2013

(54) SYSTEMS, METHODS, AND APPARATUS OF A LOW CONDUCTANCE SILICON MICRO-LEAK FOR MASS SPECTROMETER INLET

(75) Inventors: Dan N. Harpold, Beltsville, MD (US); Hasso B. Niemann, Columbia, MD (US); Brian G. Jamieson, Severna Park, MD (US); Bernard A. Lynch, San Antonio, TX (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 261 days.

(21) Appl. No.: 12/889,014

(22) Filed: Sep. 23, 2010

(65) Prior Publication Data

US 2011/0095181 A1    Apr. 28, 2011

Related U.S. Application Data

(63) Continuation of application No. 11/862,550, filed on Sep. 27, 2007, now abandoned.

(60) Provisional application No. 60/891,846, filed on Feb. 27, 2007.

(51) Int. Cl.
*H01L 27/148* (2006.01)

(52) U.S. Cl.
USPC ............ 257/241; 257/244; 257/622; 216/17; 216/20

(58) Field of Classification Search
USPC ...... 257/40, 100, 618, 622, 241, 244; 216/13, 216/20, 41, 8, 33; 250/286, 292, 288
See application file for complete search history.

(56) References Cited

U.S. PATENT DOCUMENTS

| 7,189,367 B2 * | 3/2007 | Yamamoto et al. ............ 422/130 |
| 2003/0073393 A1 * | 4/2003 | Noguchi ........................ 451/285 |
| 2004/0035701 A1 * | 2/2004 | Han et al. ....................... 204/451 |

* cited by examiner

*Primary Examiner* — Lan Vinh (57) ABSTRACT

Systems, methods and apparatus are provided through which in some embodiments a mass spectrometer micro-leak includes a number of channels fabricated by semiconductor processing tools and that includes a number of inlet holes that provide access to the channels.

5 Claims, 9 Drawing Sheets

SYSTEMS, METHODS, AND APPARATUS OF A LOW CONDUCTANCE SILICON MICRO-LEAK FOR MASS SPECTROMETER INLET

RELATED APPLICATION

This application claims the benefit of U.S. Provisional Application Ser. No. 60/891,846, filed Feb. 27, 2007 under 35 U.S.C. 119(e). This application is a continuation application of U.S. application Ser. No. 11/862,550, entitled "SYSTEMS, METHODS AND APPARATUS OF A LOW CONDUCTANCE SILICON MICRO-LEAK FOR MASS SPECTROMETER INLET," filed Sep. 27, 2007 now abandoned. The contents of these applications are hereby incorporated by reference.

ORIGIN OF THE INVENTION

The invention described herein was made by employees of the United States Government and may be manufactured and used by or for the Government of the United States of America for governmental purposes without the payment of any royalties thereon or therefore.

FIELD OF THE INVENTION

This invention relates generally to sampling gases, and more particularly to sampling atmospheres.

BACKGROUND

Mass spectrometers have played an important role in solar system exploration, having been employed to study the composition of atmospheres and solar system bodies on missions to the Moon, Mars, Venus, Jupiter, Saturn, Titan, and various comets. Mass spectrometers continue to be an important instrument for upcoming and planned NASA and European Space Agency missions.

An inherent challenge with conventional spaceflight mass spectrometers is the introduction of the material to be sampled (gas, solid, or liquid) into the instrument interior, which operates at vacuum. In an atmospheric sampling probe, the pressures encountered can be quite high (up to almost 100 bar for a Venus entry probe or lander) resulting in the need for a pressure restricting device between the ambient atmosphere and the instrument interior.

The relatively modest pumping speeds (1-5 liters/sec are typical) of conventional spaceflight vacuum pumps constrain the conductance of the pressure restrictor to values that are quite low, and in fact outside of the range that can be practically implemented using commonly-available tubing or a simple orifice. For example, using 0.0015" (38.1 microns μm) inner diameter tubing (available as 36 gauge stainless steel hypodermic tubing) would require a coil approximately eight hundred feet long to achieve a conductance sufficiently low to drop a 100 bar ambient to the 10–5 torr range, assuming a pumping speed of 5 liter/sec.

In addition to being sufficiently low in conductance, an inlet leak for spaceflight mass spectrometry must also be chemically inert; must not distort the gas composition being sampled by adsorbing or reacting with sampled gases differentially; and must have a reasonably fast response time (on the order of seconds or less). Finally, an inlet leak for spaceflight mass spectrometry must be robust and operable over a wide temperature and pressure range.

A inlet leak for spaceflight mass spectrometry made of a high aspect ratio tube of roughly micron-scale diameter and millimeter-scale length results in conductance of a correct order of magnitude to drop pressure from 10's of bar to the 10–5 to 10–7 mbar range typical of a mass spectrometer ion source. Conventional methods of producing such leaks have included pulled glass and crimped metal tubes both of which are prone to single point failure and are produced by either a relatively costly and labor intensive manufacturing processes (in the first case) or a relatively unrepeatable one (in the second case). Significantly, clogging of a crimped metal leak by a sulfuric acid droplet on the Pioneer Venus Probe Mass Spectrometer caused that instrument's failure to collect meaningful data over a portion of its descent trajectory. Other attempts at producing a suitable pressure restrictor have used porous frits, which tend to react differentially with sampled gases, leading to poor temporal resolution since the large surface area must equilibrate with the changing ambient pressure and composition. Alternatively, the Soviets used a piezo valve that was transiently opened. The problem with this approach was that the approach introduced a pressure burst that required time scales on the order of minutes to stabilize, thus reducing sample resolution.

For at least the reasons stated above, and for other reasons stated below, which will become apparent to those skilled in the art upon reading and understanding the present specification, there is a need in the art for systems, methods and apparatus of an inlet leak in a spaceflight mass spectrometer that are sufficiently low in conductance and chemically inert; do not distort the gas composition being sampled by adsorbing or reacting with sampled gases differentially, have a reasonably fast response time (on the order of seconds or less), are robust and operable over a wide temperature and pressure range, and occupy a small volume.

SUMMARY

The above-mentioned shortcomings, disadvantages, and problems are addressed herein, which will be understood by reading and studying the following specification.

In one aspect, a method to fabricate at least one micro-leak structure includes fabricating channels in the at least one micro-leak structure by a plurality of semiconductor processing tools and the method includes mounting the at least one micro-leak structure in an inlet a tube of a gaseous sampling device.

In another aspect, a micro-leak structure includes a first silicon wafer having high aspect ratio serpentine channels etched by a semiconductor processing tool onto a surface of the first silicon wafer. In some embodiments each channel is about 7 millimeters in length, about 1.5 microns in width, and about 1 micron in depth. The micro-leak structure also includes a second silicon wafer that is fusion bonded to the first silicon wafer. The second silicon wafer has inlet holes and an outlet hole that provide access to the ends of the channels. The number of inlet holes is the same as the number of channels.

In yet a further aspect, a mass spectrometer micro-leak includes a first wafer having high aspect ratio serpentine channels etched onto a surface of the first silicon wafer in which each channel is about 7 millimeters in length, about 1.5 microns in width, and about 1 micron in depth. The mass spectrometer micro-leak further includes a second silicon wafer that is fusion bonded to the first silicon wafer. The second silicon wafer has inlet holes and an outlet hole that provide access to the ends of the channels. The mass spectrometer micro-leak is produced by a process including fabricating channels in the at least one micro-leak structure in a plurality of semiconductor processing tools and then mounting the at least one micro-leak structure in a tube of a spectrometer.

Apparatus, systems, and methods of varying scope are described herein. In addition to the aspects and advantages described in this summary, further aspects and advantages will become apparent by reference to the drawings and by reading the detailed description that follows.

DETAILED DESCRIPTION

In the following detailed description, reference is made to the accompanying drawings that form a part hereof, and in which is shown by way of illustration specific embodiments which may be practiced. These embodiments are described in sufficient detail to enable those skilled in the art to practice the embodiments, and it is to be understood that other embodiments may be utilized and that logical, mechanical, electrical, and other changes may be made without departing from the scope of the embodiments. The following detailed description is, therefore, not to be taken in a limiting sense.

The detailed description is divided into four sections. In the first section, a system level overview is described. In the second section, apparatus of embodiments are described. In the third section, methods of embodiments are described. Finally, in the fourth section, a conclusion of the detailed description is provided.

System Level Overview

Figure 1:
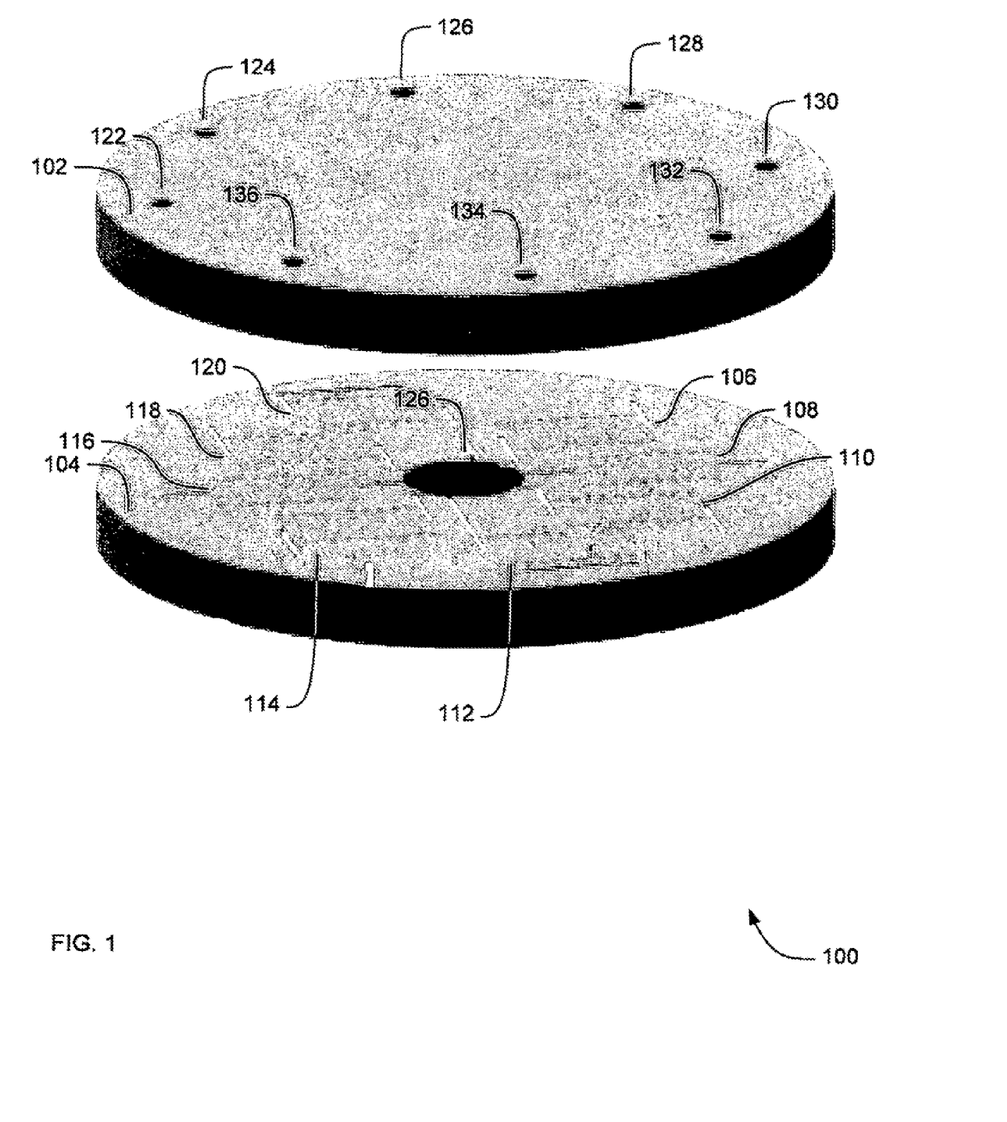
FIG. 1 is an exploded-view isometric diagram that provides an overview of a micro-leak structure for use in a planetary atmospheric sampling mass spectrometer.

FIG. 1 is an exploded-view isometric diagram that provides an overview of a micro-leak structure 100 for use in a planetary atmospheric sampling mass spectrometer. The exploded-view of micro-leak structure 100 shows two unbonded separate die 102 and 104 that make-up a finished die. In practice, die 102 and die 104 are fusion bonded together. Die 102 and die 104 are also known as silicon micro-leaks. Die 102 and die 104 are fabricated from silicon wafers. The die 102 and 104 are individual pieces of the wafer (not shown), which are separated from the wafer in the final steps of processing. So, there are actually many die on a single wafer.

Die 104 includes high aspect ratio serpentine channels, such as channels 106, 108, 110, 112, 114, 116, 118 and 120 that are etched onto the surface. FIG. 1 is an exploded view in order to show the channels. In the example of micro-leak structure 100, the channels (106, 108, 110, 112, 114, 116, 118 and 120) are about 7 millimeters (mm) in length, about 1.5 μm (microns) in width, and about 1 μm in depth. The dies 102 and 104 are etched from silicon wafers. In micro-leak structure 100, multiple parallel channels create redundancy and thus reduce the effect of any single channel becoming clogged with a particle or droplet.

Die 102 also includes inlet holes, 122, 124, 126, 128, 130, 132, 134 and 136 and outlet hole 126 that provide access to the ends of the channels. The channels are etched through the bonded wafer pair 102 and 104. In some embodiments of micro-leak structure 100, the number of inlet holes is the same as the number of channels. For example, eight channels and eight inlet holes are shown in FIG. 1.

In some embodiments, exposed surfaces of the micro-leak structure 100 are composed of silicon dioxide, which is chemically inert and not reactive differentially with gas constituents.

While the micro-leak structure 100 is not limited to any particular die 102 and 104, channels 106, 108, 110, 112, 114, 116, 118 and 120, inlet holes 122, 124, 126, 128, 130, 132, 134 and 136 and outlet hole 126, for sake of clarity die 102 and 104, channels 106, 108, 110, 112, 114, 116, 118 and 120, inlet holes 122, 124, 126, 128, 130, 132, 134 and 136 and outlet hole 126 have been described. In particular, the micro-leak structure 100 is not limited to the eight inlet holes 122, 124, 126, 128, 130, 132, 134 and 136 shown in micro-leak structure 100. Other embodiments have a different number of inlet holes and other particular fluidic features.

Micro-leak structure 100 can be implemented in applications beyond spaceflight mass spectrometry, such as miniature mass spectrometer and portable instruments for use in such diverse applications as homeland security and point-of-care diagnostics. These applications require improved and highly miniature sample introduction methods that is provided by the micro-leak structure 100. The systems, methods and apparatus described herein are amenable to miniaturization, and to integration in silicon with other instrument components.

Apparatus of an Embodiment

In the previous section, a system level overview of the operation of an embodiment was described. In this section, an exemplary apparatus of embodiments are described by reference to a series of diagrams.

Figure 2:
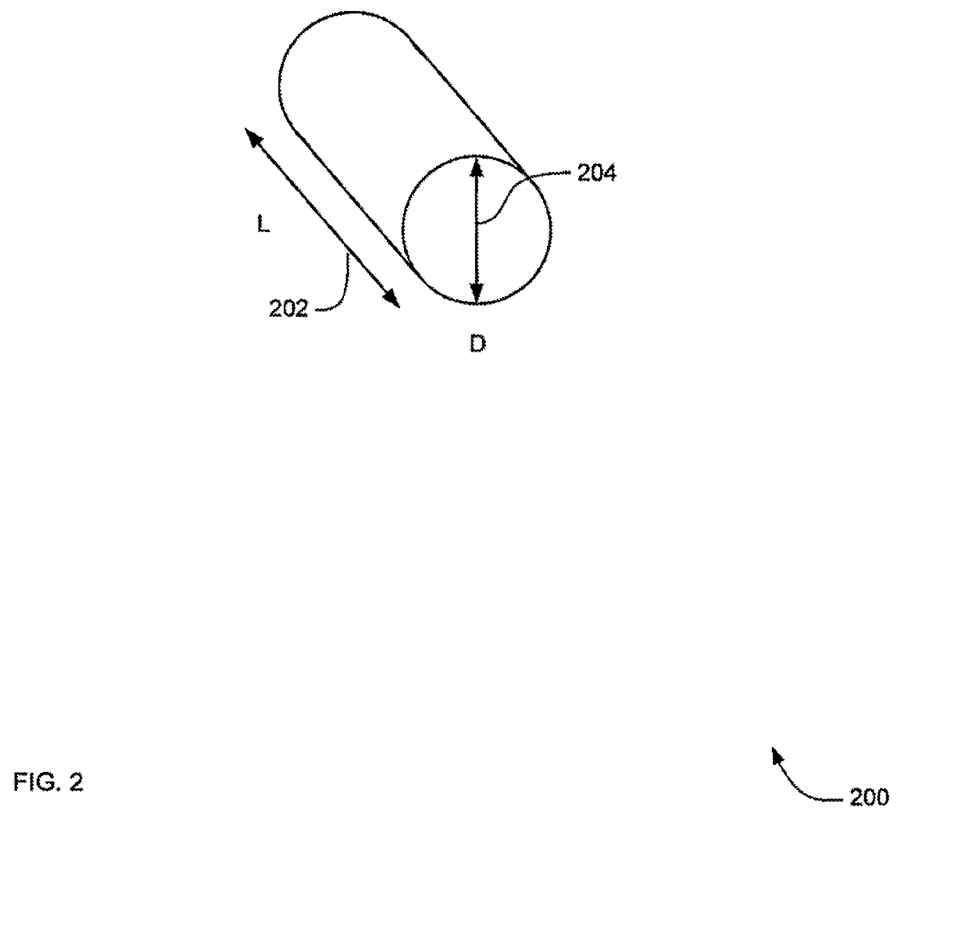
FIG. 2 is an isometric diagram of a round tube in which some embodiments of a micro-leak structure can be mounted.
Figure 4:
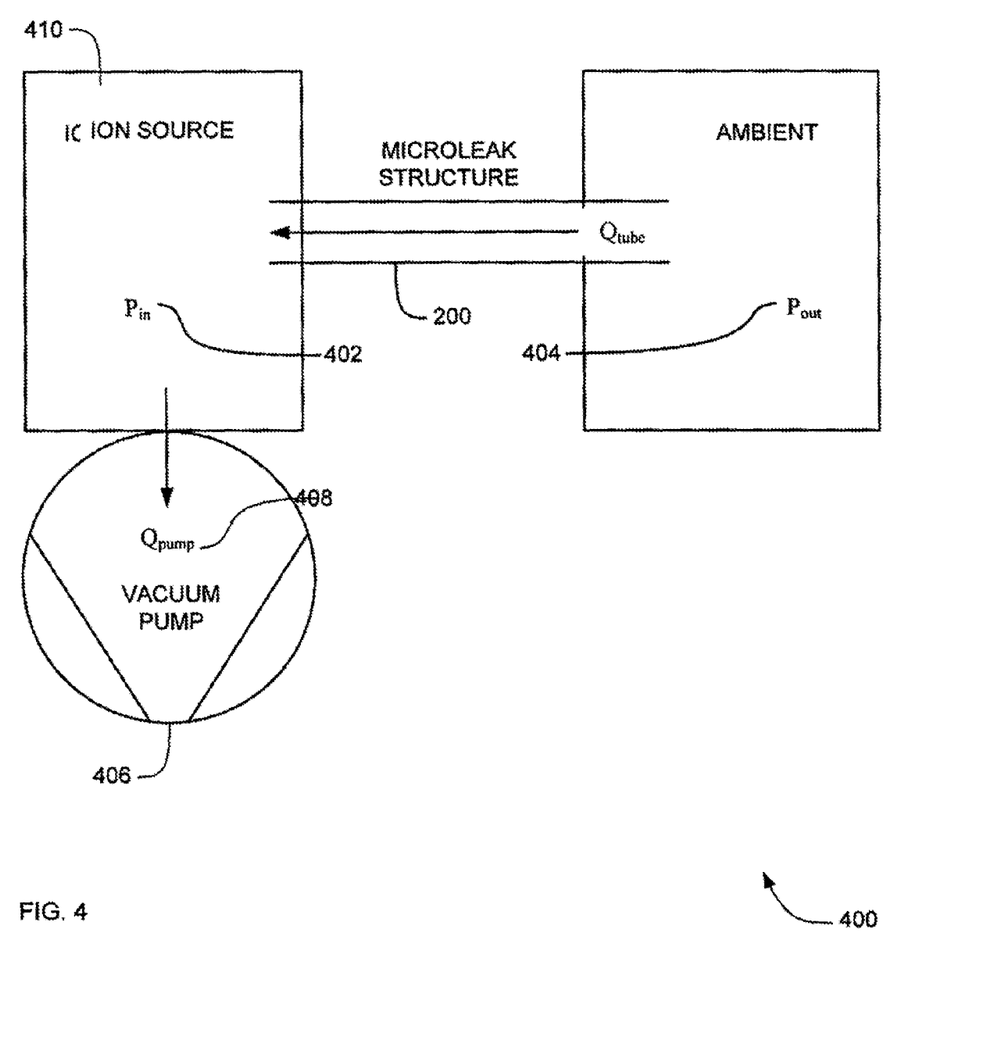
FIG. 4 is a block diagram of a mass spectrometer in which some embodiments of a micro-leak structure can be mounted.

FIG. 2 is an isometric diagram of a round tube 200 in which some embodiments of a micro-leak structure can be mounted. Micro-leak structure 100 is one example of a micro-leak structure which can be mounted in the round tube 200. FIG. 4 is a block diagram of a mass spectrometer 400 in which some embodiments of a micro-leak structure can be mounted.

In the calculations that follow, FIG. 2 and FIG. 4 are referenced for variable definitions. In the calculations, International System of Units (SI) units are used, however, for reporting standard vacuum system quantities, such as pressure, pumping speed, and throughput, the more familiar mbar (or bar), liter/sec, and milibar·liter/sec are used. The SI is maintained by the International Bureau of Weights and Measures (BIPM) located in Paris, France.

In the viscous flow domain, mass flow (throughput) through round tube 200 with L (200 in FIG. 2) is greater than d (204 in FIG. 2) (L>>D) is given by the Hagen-Poiseuille Equation:

$$Q_{tube} = \frac{\pi}{256\eta} \frac{d^4}{L}(P_{out}^2 - P_{in}^2) \quad \text{Equation 1}$$

Figure 3:
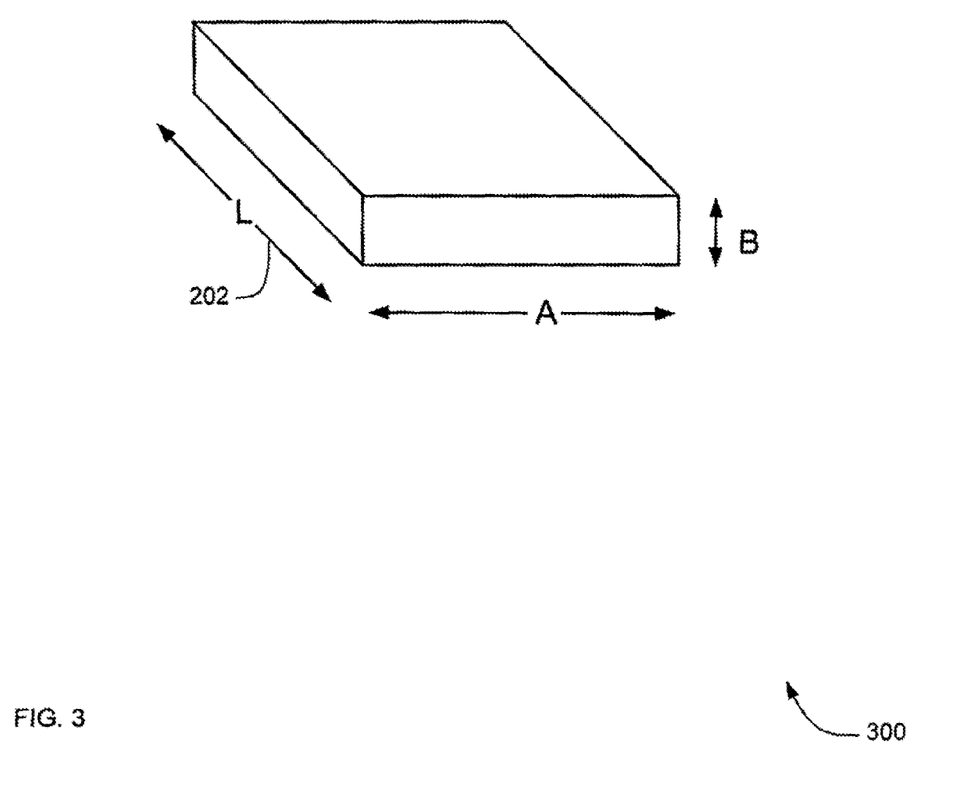
FIG. 3 is an isometric diagram of a tube with a rectangular cross-section in which some embodiments of a micro-leak structure can be mounted.

In the case of a tube with rectangular cross-section, as shown in FIG. 3, the width and height (A and B) can be converted into an approximately equivalent effective diameter, d, by setting the cross-sectional areas of the round and rectangular cross-sections equal to each other. This calculated effective diameter, d, can then be used in equation 1. In equation 1, $Q_{tube}$ is a quantity of gas flowing through the tube, $\eta$ is the absolute viscosity, L 202 is the tube length, and d 204 is the tube diameter. $P_{out}$ (402 in FIG. 4) and $P_{in}$ (404 in FIG. 4) are pressures outside and inside the mass spectrometer 400, respectively.

Furthermore, a quantity of gas that can be removed by a vacuum pump 406 can be calculated according to the Equation 2 below:

$$Q_{pump} = P_{in} \cdot S \quad \text{Equation 2}$$

In Equation 2, S is the pumping speed and $P_{in}$ 404 is pressure inside the mass spectrometer 400. These two throughputs, S and $P_{in}$ 404, gas is admitted by the micro-leak structure (such as micro-leak structure 100), $Q_{leak}$, and a quantity of gas that is pumped out of the mass spectrometer, $Q_{pump}$ 408, must be equal at steady state. Equation 1 and Equation 2 can thus be equated, allowing a solution for the desired device geometry (tube diameter) as a function of the other parameters:

$$d = \sqrt[4]{\frac{256 S P_{in} \eta L}{\pi(P_{out}^2 - P_{in}^2)}} \quad \text{Equation 3}$$

In one example of an implementation of Equation 3, in order to constrain the design space, a total micro-leak length of 7 millimeters is chosen. A total micro-leak length of 7 millimeters results in a reasonable layout for packaging of the final die, which is several square micrometers in area. Eight (8) parallel channels (as shown in FIG. 1) are implemented to reduce the impact of a single channel clogging. As a result, the effective micro-leak conductance is eight times that of a single 7 mm long channel.

Further calculations are accordingly based on a single channel of 875 μm in length, which is a length that is about equal to the length of eight of the 7 mm long channels. A pumping speed of 5 lit/second is used, a reasonable value for current flight vacuum pumps. For viscosity, the published value of $CO_2$ (the Venus atmosphere's major species) at 400° C. is used. Finally, a nominal mass spectrometer ion source pressure is specified for a suitable representative ambient pressure, given knowledge of mass spectrometer operation and performance. Here $2 \times 10^{-5}$ mbar in the ion source at an external pressure of 25 Bar is chosen. These values result in a desired device diameter of 1.4 μm. A channel width of 1.5 μm can also be selected, and the channel depth (determined by a timed etch) was correspondingly adjusted to 1 μm. This indicates a rectangular cross-sectional area approximately equivalent to a round tube of diameter 1.4 μm.

Figure 5:
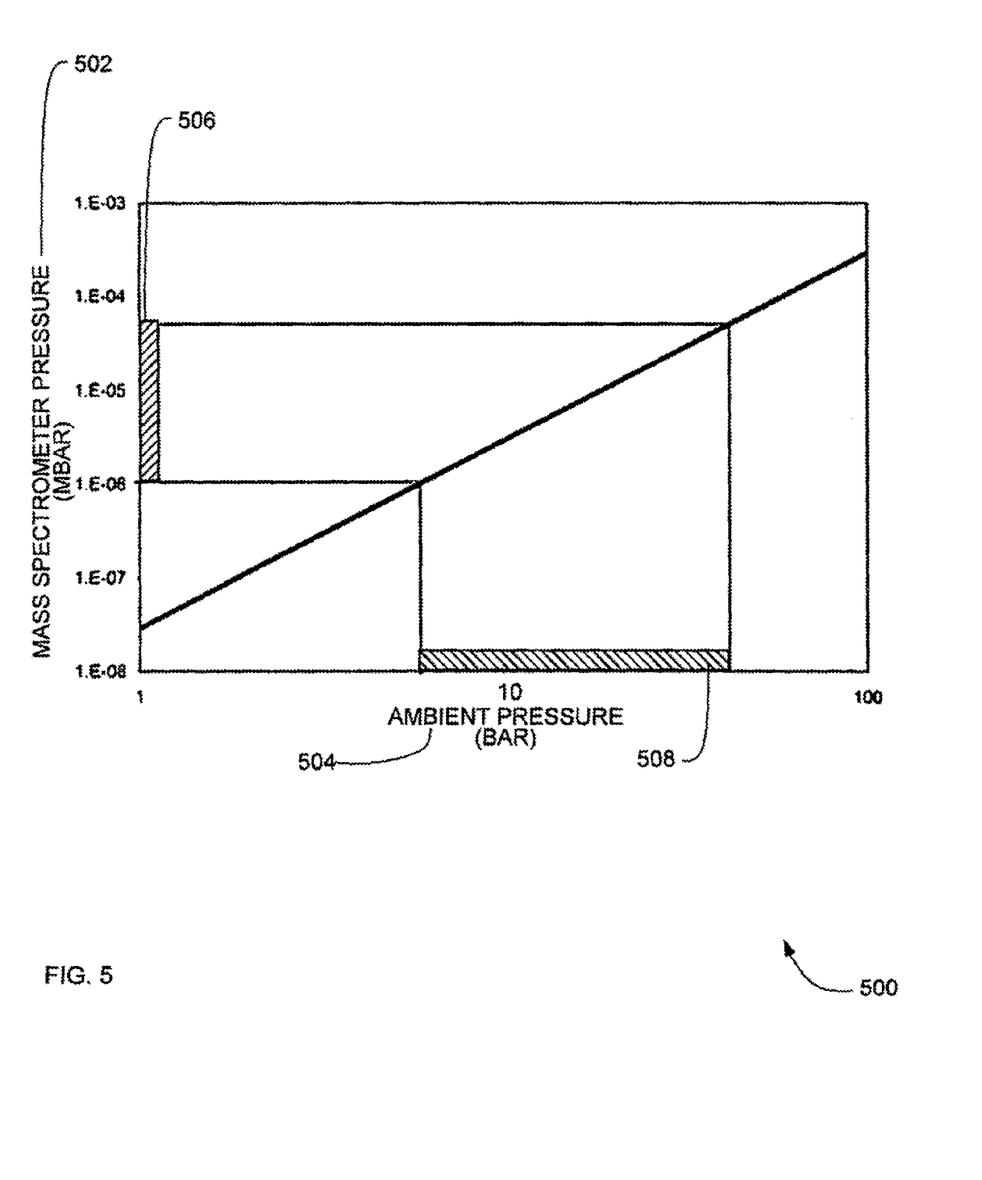
FIG. 5 is a diagram of a chart of calculation of mass spectrometer pressure as a function of the ambient atmospheric pressure.

FIG. 5 is a diagram of a chart 500 of calculation of mass spectrometer pressure as a function of the ambient atmospheric pressure. Chart 500 shows a calculation of mass spectrometer pressure (y axis 502) as a function of the ambient atmospheric pressure (x axis 504) using channel dimensions of 1.5 microns in width by 1 micron in depth by 875 microns in length. The banded area 506 on the y axis 502 corresponds to the range of "acceptable" mass spectrometer pressures used in some embodiments ($1 \times 10^{-6}$ to $5 \times 10^{-5}$ mbar.) A corresponding acceptable device operating range 508 is on the x-axis 504.

Chart 500 shows the mass spectrometer pressure, $P_{in}$, for a range of external ambient pressures around the single nominal design value of 25 bar. These calculations use a modified form of the Hagen-Poiseuille Equation (Equation 1 above) that accounts for its rectangular cross section. Chart 500 shows that the mass spectrometer ion source 410 in pressure falls within the acceptable range of $10^{-6}$ to $5 \times 10^{-5}$ mbar for ambient pressures between 6 and 40 bars. In order to extend this operating range during an actual mission, several differently sized leaks (of decreasing diameter) could be needed for different regions of atmospheric pressure. These leaks, which in past missions have been separate, free-standing devices, are in that case separately connected and valved into the mass spectrometer. Using the approach described here, leaks of different diameter could easily be implemented on the same chip. An on-chip one-shot valve could then be used to switch the different leaks into the mass spectrometer, with one set of plumbing and valves between the leak chip and the mass spectrometer.

Figure 6:
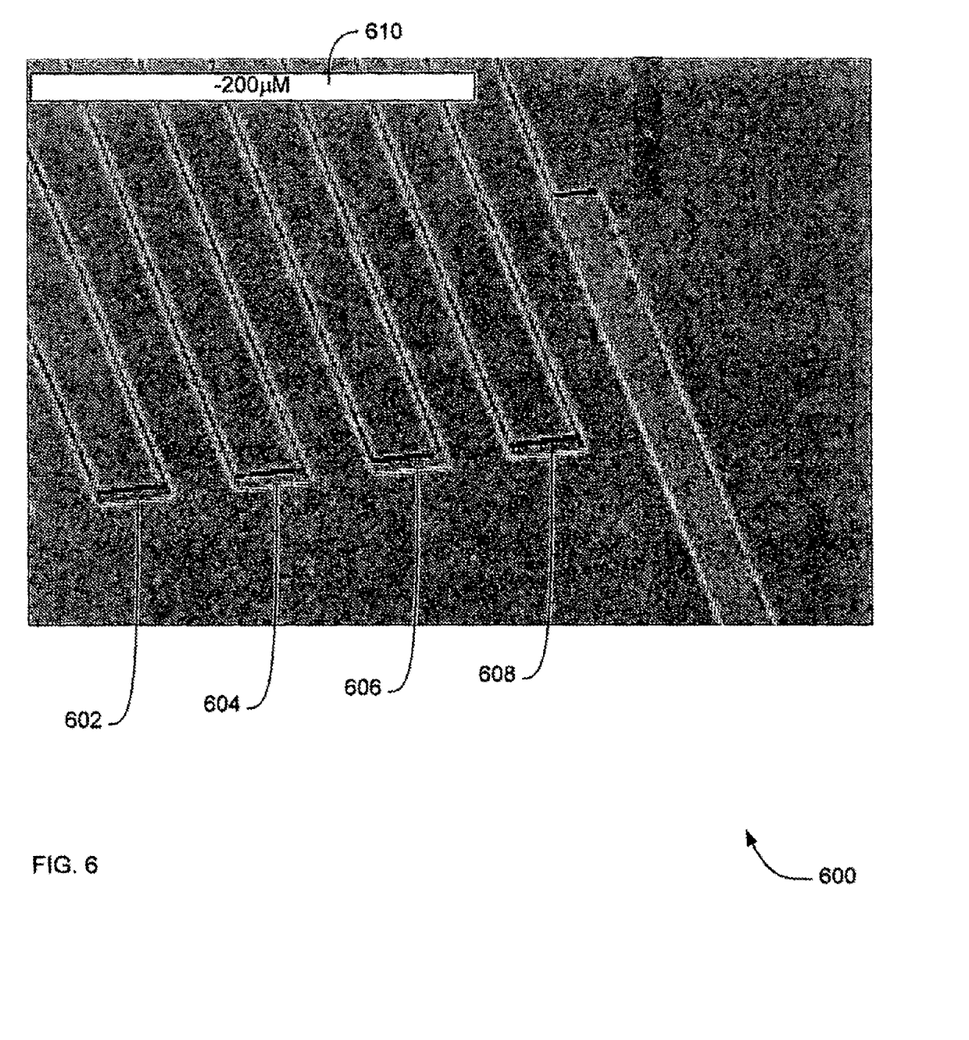
FIG. 6 is an isometric diagram of a surface of a micro-leak structure having channels.

FIG. 6 is an isometric diagram of a surface 600 of a micro-leak structure having channels. Channels 602, 604, 606 and 608 are etched onto the surface 600. Scale bar 610 shows the relative size of the channels 602, 604, 606 and 608. In some embodiments, channels 602, 604, 606 and 608 are substantially similar to channels 106, 108, 110, 112, 114, 116, 118 and 120 in FIG. 1.

Figure 7:
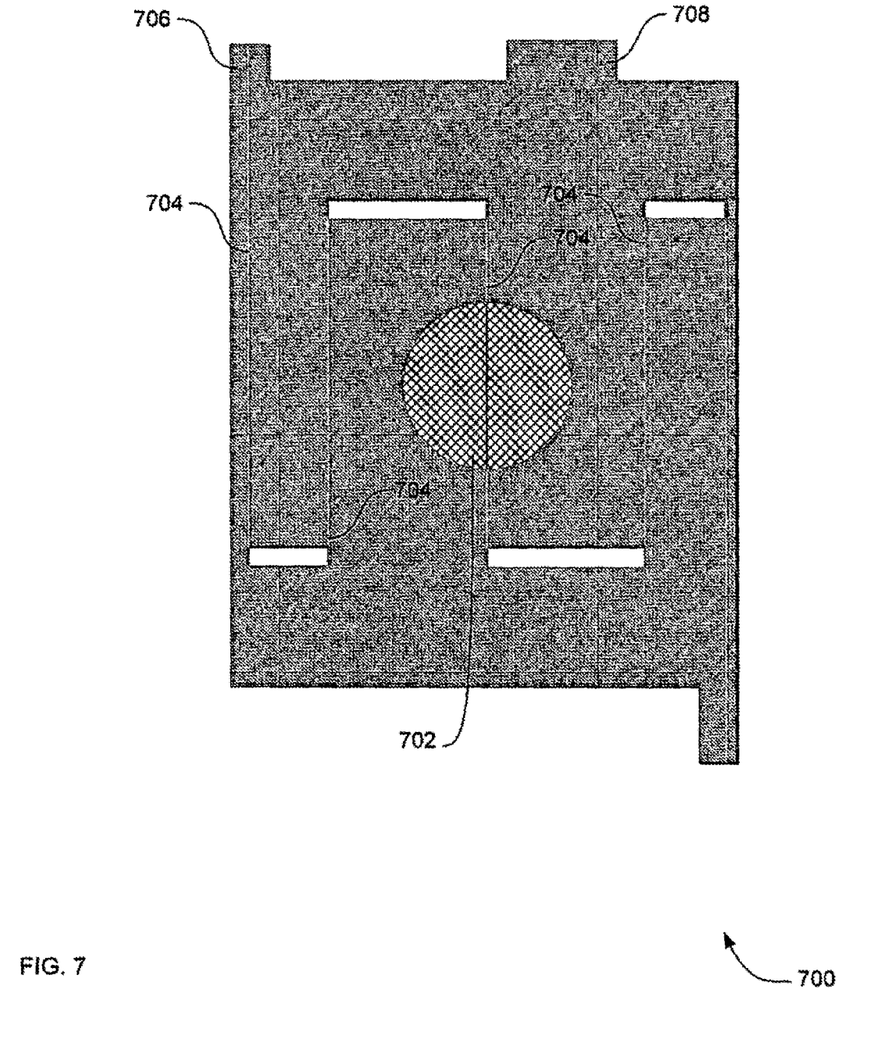
FIG. 7 is a diagram of a fabricated micro-leak structure having an integrated platinum heater.
Figure 8:
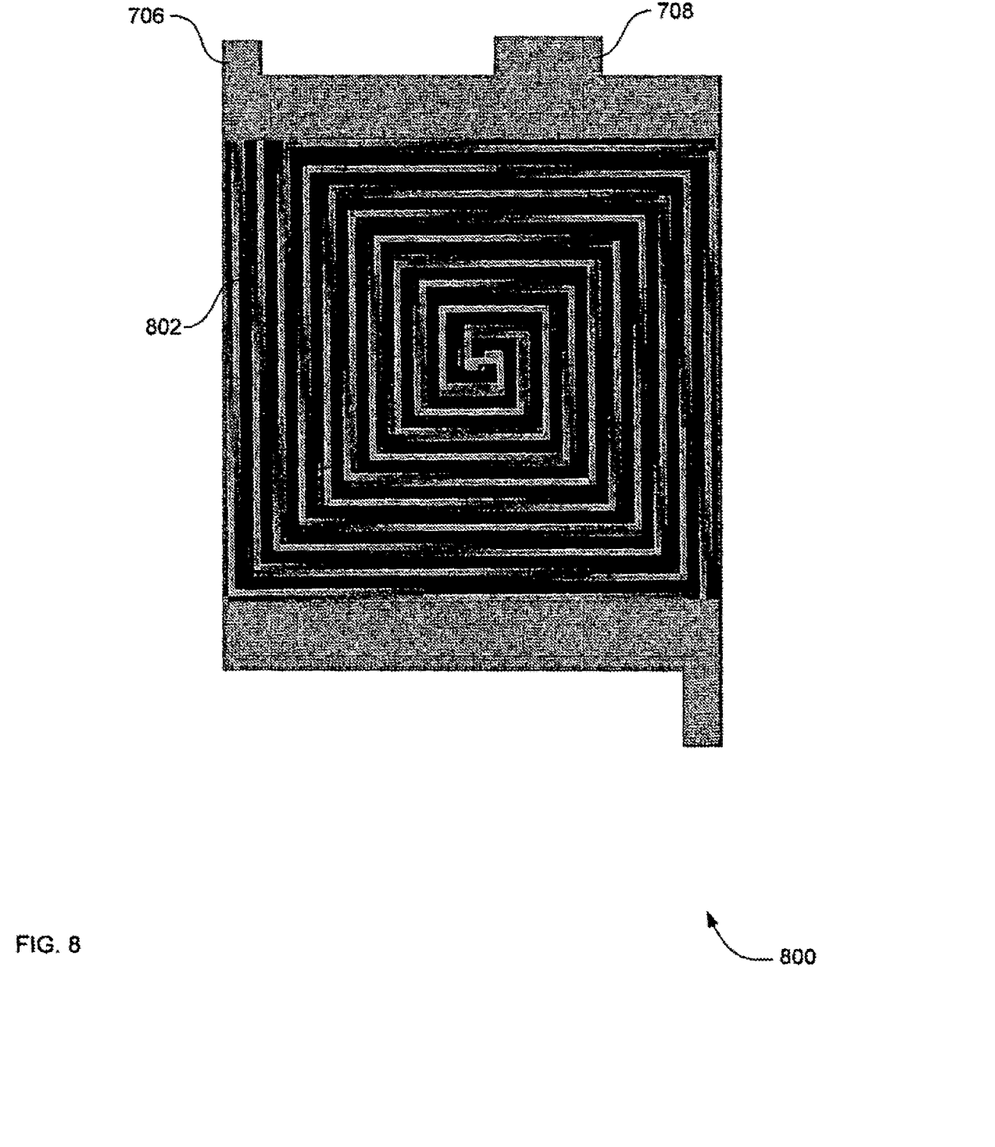
FIG. 8 is a block diagram of a reverse side of a fabricated micro-leak structure having an integrated platinum heater.

FIG. 7 is a diagram of a fabricated micro-leak structure 700 having an integrated platinum heater. The heater is fabricated on the backside of the thermally-isolated block of silicon, and thus is not visible in FIG. 7, but the heater is shown in FIG. 8 below. In micro-leak structure 700, a plug of aluminum 702 (melting point ~650 Celsius) is heated to re-flow the plug and seal a channel 704, i.e., for use as a "one shot" valve. In some embodiments, integrated heaters could also be used to vaporize potentially clogging aerosol droplets, or to pyrolize droplets for the purposes of making measurements. Micro-leak structure 700 also includes electrical leads 706 and 708 to the heater on the reverse of the micro-leak structure 700.

FIG. 8 is a block diagram of a reverse side of a fabricated micro-leak structure 700 having an integrated platinum heater. In the embodiment of micro-leak structure 700, the integrated platinum heater 802 is a coil. In the embodiment shown, the fabrication process involves a Pyrex-to-silicon anodic bond, rather than fusion bond described in FIG. 9 below. The Pyrex-to-silicon anodic bond provides viewing of the heater 802 through Pyrex during testing, and eliminates the process incompatibility of the metal heater with the fusion bonding process. Other embodiments can include high-temperature compatible micro-leak structures with integrated heaters with a polysilicon heater. A current source can be applied to the heater 802 through external bond pads, and temperatures of greater than (800 degrees Celsius) can be briefly achieved. Lower temperatures can be achieved for sustained periods. The same resistive heater can be calibrated and used as a thermometer for determining the exact inlet temperature at the point of entry of the gas into the mass spectrometer, rather than further away from the actual leak where the temperature is conventionally measured.

The ability to integrate additional functionality into the silicon micro-leak is an appealing feature of using microfabrication technology. In some embodiments, a heater is implemented to heat the inlet in order to vaporize droplets (such as the sulfuric acid droplets encountered in a Venus probe) and thus prevent clogging. In some embodiments, a heater is implemented to melt a small, integrated plug of metal that would then reflow down the pressure gradient in order to seal a particular micro-leak channel. This type of electrically-activated "one-shot" valve could be used to open and close micro-leak arrays of different conductances as the mass spectrometer encountered different pressure regimes during a descent sequence. This would eliminate the need for separate devices, each being valved and plumbed into the mass spectrometer inlet.

Method of an Embodiment

In the previous section, an apparatus of the operation of an embodiment was described. In this section, the particular processes of such an embodiment are described by reference to a series of flowcharts.

Figure 9:
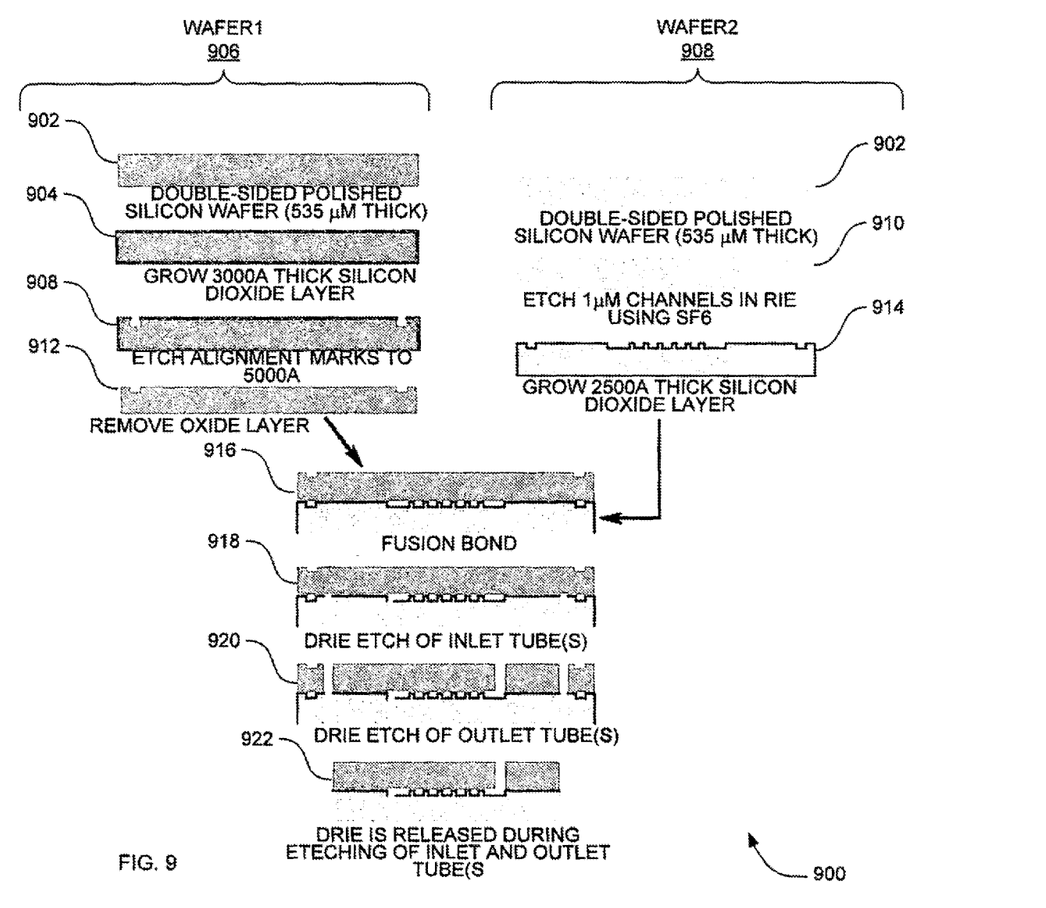
FIG. 9 is a process-flow of a process to fabricate micro-leak structures, according to an embodiment.

FIG. 9 is a process-flow of a process 900 to fabricate micro-leak structures, according to an embodiment. Process 900 solves the need in the art for methods and apparatus of an inlet leak in a spaceflight mass spectrometer that is low in conductance and chemically inert does not distort the gas composition being sampled by adsorbing or reacting with sampled gases differentially, has a reasonably fast response time (on the order of seconds or less) is robust and operable over a wide temperature and pressure range, and is implemented in a small device volume.

Process 900 include cleaning and thermally oxidizing a four-inch double-side polished (DSP) silicon wafers 902 to produce a protective silicon dioxide film 904 of about 2500 angstroms (Å) or about 3000 angstroms (Å), which is referred to as Wafer #1 906. The cleaning and oxidizing of the DSP silicon wafers 902 provides successful fusion bonding of the DSP silicon wafers 902 because cleaning and oxidizing the DSP silicon wafers 902 protects the bonding surface of the DSP silicon wafers 902 during fabrication.

Each of the DSP silicon wafers 904 is then patterned with alignment marks using standard photolithography techniques (e.g., spin coating and ultraviolet (UV) light) 908. Contact aligner and the alignment marks are transferred to the silicon in a brief sulfur hexafluoride (SF6) plasma etch. The inlet and outlet holes are aligned with the micro-channels, which will be buried in the device later. Similar patterning and etching steps are carried out on a second wafer 908 (Wafer #2), in order to create the shape 910 of the micro-channels themselves, as well as the wider plenum areas (as shown in FIG. 1). The photoresist is then removed from both wafers 906 and 908 and the patterned oxide layers is removed 912 from the wafer with alignment marks (wafer #1) in a dilute hydrofluoric acid (HF) solution (1:10 HF:H2O). A dilute HF solution is used to leave a smoother silicon surface that can interfere with the bonding surface of the wafer. A 2500 Å-thick oxide layer is then grown 914 onto the wafer 908 containing the channels (Wafer #2) to serve as an etch-stop when the inlet and outlet holes are formed.

The lithographically-defined channels can be of nearly arbitrary shape and dimensions, allowing precise control over both the final conductance and the shape and geometry of the fabricated device.

Next, the patterned wafers 906 and 908 are cleaned in preparation for fusion bonding. The cleaning is impotent for a strong and successful bond, and the cleaning is advantageous for bond strength and to reverse the order of the cleans (from the commonly accepted order in the so-called RCA clean) so that SC2 (HCL/H2O2/H20 1:1:5) is carried out first, followed by a 30" dip in HF:H2O (1:10), followed by SC1 (NH4OH/H2O2/H2O 1:1:5.) The wafers 906 and 908 are blown dry in dry N2 and immediately loaded into a Suss SB6 wafer bonder 916, where wafers 906 and 908 are aligned, contacted and then bonded at a temperature of 500 degree Celsius and 5 bar of tool pressure for fifteen minutes. The bonded wafer pair 916 is immediately unloaded and put into a thermal oxidation tube where the bonded wafer pair 916 is annealed at a temperature of 1200 degrees Celsius for twelve hours. After annealing, the bonded wafer pair is stripped of any minor oxidation that occurred during the high temperature step using a buffered oxide etch (BOE). The alignments and quality of the bond is verified by viewing the stack through a microscope with an infrared camera. Suss is located at SUSS MicroTec AG, Schleißheimer Str. 90, D 85748 Garching.

Using a contact mask aligner with backside alignment capabilities (e.g., a Suss aligner model MA6), inlet holes and circular dicing lanes (to define the final device diameter) are patterned into one side of the bonded wafer pair. The pair is then placed in a deep reactive ion etch (DRIE), where the holes and dicing lanes are etched through to the center of the wafer pair 918. Because the DRIE slows down dramatically on oxide, the buried oxide layer acts as an etch stop for this step. In addition, the buried oxide etch stop layer prevents the DRIE step from damaging the plenums at the beginning of every channel and allows visual verification that the etching has gone half-way through the stack. Similar steps create matching dicing lanes and a single 500 µm (microns) outlet hole on the opposite side of the wafer pair 920. The dicing lanes from each side meet during this step, with the result that the complete 7 mm diameter devices are punched out of the wafer pair 922.

The completed etched silicon micro-leaks are glass frit bonded into a Kovar tube. Kovar is a nickel-cobalt ferrous alloy designed to be compatible with the thermal expansion characteristic of sealing to borosilicate glass. A "shelf" inside the Kovar tube gives the device mechanical support for bonding and increases the bonded surface area. For use in a mass spectrometer, the micro-leak could be integrated directly into a flange-mounted component using the same glass frit bonding technology. For the purposes of device testing only, the Kovar tube with the packaged die is attached to a mini vacuum flange so that the Kovar tube can be connected to a helium leak detector. When considering this relatively bulky piece of hardware it is easy to lose sight of the advantages of microfabrication described previously, e.g., integration and miniaturization. Note first, that this packaging scheme is intended only as a stopgap measure to interface to existing lab hardware. Also, the additional levels of integration that can be undertaken with no additional overhead in packaging is a significant benefit. For example, the inclusion of many leaks of different diameters with accompanying one-shot valves, or even of on-chip electron guns and ion lens elements, can be accomplished within the die packaging scheme presented here.

CONCLUSION

Systems, method and apparatus of a micro-leak structure have been described. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations.

In particular, one of skill in the art will readily appreciate that the names of the methods and apparatus are not intended to limit embodiments. Furthermore, additional methods and apparatus can be added to the components, functions can be rearranged among the components, and new components to correspond to future enhancements and physical devices used in embodiments can be introduced without departing from the scope of embodiments. One of skill in the art will readily recognize that embodiments are applicable to future micro-leak structures and different mass spectrometers.

The terminology used in this application with respect to micro-leak structure, inlet holes, and outlet holes, channels and mass spectrometers is meant to include all environments and alternate technologies which provide the same functionality as described herein.

We claim:

1. A mass spectrometer micro-teak structure comprising a first silicon wafer having a plurality of high aspect ratio serpentine channels etched onto a surface of the first silicon wafer, each channel being about 7 millimeters in length, about 1.5 microns in width, and about 1 micron in depth, and a second silicon wafer that is fusion bonded to the first silicon wafer, the second silicon wafer having inlet holes and an outlet hole that provide access to the ends of the channels, wherein the number of inlet holes equals the number of channels, the mass spectrometer micro-leak structure produced by the process comprising:
   fabricating channels in the micro-leak structure by a plurality of semiconductor processing tools; and
   mounting the micro-leak structure in an inlet of a tube of a spectrometer.

2. The mass spectrometer micro-leak structure of claim 1, wherein the process further comprises:
   patterning the second silicon wafer in order to create a shape of the micro-channels and wider plenum areas such that the micro-channels and the wider plenum areas reduce gas pressure in the mass spectrometer micro-leak structure.

3. The mass spectrometer micro-leak structure of claim 1, wherein the process further comprises:
   bonding the silicon wafers at a temperature of 500 degree Celsius and 5 bar of tool pressure for fifteen minutes.

4. The mass spectrometer micro-leak structure of claim 1, wherein the process further comprises:
   annealing at a temperature of 1200 degrees Celsius for twelve hours.

5. The mass spectrometer micro-leak structure of claim 1, wherein the silicon wafers are fabricated from 4-inch double-sided polished silicon wafers.

* * * * *